(12) United States Patent
Torvinen et al.

(10) Patent No.: US 11,569,988 B2
(45) Date of Patent: Jan. 31, 2023

(54) SECURITY OF CIPHERING AND INTEGRITY PROTECTION

(71) Applicant: Telefonaktiebolaget LM Ericsson (publ), Stockholm (SE)

(72) Inventors: Vesa Torvinen, Sauvo (FI); Nicklas Johansson, Brokind (SE); Atle Monrad, Froland (NO); Gang Ren, Shanghai (CN); Mikael Wass, Sätila (SE); Monica Wifvesson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 119 days.

(21) Appl. No.: 17/130,150

(22) Filed: Dec. 22, 2020

(65) Prior Publication Data

US 2021/0111882 A1    Apr. 15, 2021

Related U.S. Application Data

(63) Continuation of application No. 16/318,620, filed as application No. PCT/EP2017/063454 on Jun. 2, 2017, now Pat. No. 10,887,089.

(30) Foreign Application Priority Data

Jul. 18, 2016    (WO) ................ PCT/CN2016/090265

(51) Int. Cl.
*H04W 4/00*     (2018.01)
*H04L 9/08*     (2006.01)
(Continued)

(52) U.S. Cl.
CPC .......... *H04L 9/0844* (2013.01); *H04L 9/3242* (2013.01); *H04L 63/123* (2013.01);
(Continued)

(58) Field of Classification Search
CPC ... H04L 9/0844; H04L 9/3242; H04L 63/123; H04L 63/126; H04W 12/033
See application file for complete search history.

(56) References Cited

U.S. PATENT DOCUMENTS

2005/0033960 A1\* 2/2005 Vialen ................... H04L 63/123
                                                    713/170
2010/0017603 A1   1/2010 Jones
(Continued)

FOREIGN PATENT DOCUMENTS

CN    101478548 A    7/2009
CN    101800658 A    8/2010
(Continued)

OTHER PUBLICATIONS

International Search Report and Written Opinion issued in International Application No. PCT/EP2017/063454, dated Jul. 18, 2017, 13 pages.
(Continued)

*Primary Examiner* — Omoniyi Obayanju
(74) *Attorney, Agent, or Firm* — Rothwell, Figg, Ernst & Manbeck, P.C.

(57) ABSTRACT

A network node of a mobile communications network may need to generate at least one new Input Offset Value, IOV value, for use in protecting communications between the network node and a mobile station. The network node then associates a fresh counter value with the or each new IOV value; calculates a Message Authentication Code based on at least the at least one new IOV value, the fresh counter value associated with the or each new IOV value, and a constant indicating that the Message Authentication Code is calculated to protect the new IOV value; and transmits the at least one new IOV value, the fresh counter value associated with
(Continued)

the or each new IOV value, and the calculated Message Authentication Code to the mobile station.

17 Claims, 9 Drawing Sheets

(51) Int. Cl.
| | |
|---|---|
| *H04L 9/40* | (2022.01) |
| *H04L 9/32* | (2006.01) |
| *H04W 12/033* | (2021.01) |
| *H04W 12/106* | (2021.01) |
| *H04W 12/108* | (2021.01) |
| *H04W 12/122* | (2021.01) |
| *H04W 12/0431* | (2021.01) |
| *H04W 12/0471* | (2021.01) |

(52) U.S. Cl.
CPC ........ *H04L 63/126* (2013.01); *H04L 63/1466* (2013.01); *H04W 12/033* (2021.01); *H04W 12/0431* (2021.01); *H04W 12/0471* (2021.01); *H04W 12/106* (2021.01); *H04W 12/108* (2021.01); *H04W 12/122* (2021.01); *H04L 2209/80* (2013.01)

(56) References Cited

U.S. PATENT DOCUMENTS

| | | | |
|---|---|---|---|
| 2014/0269069 | A1 | 9/2014 | D'Abreu |
| 2016/0191408 | A1* | 6/2016 | Yajima .................. H04L 63/123 709/225 |
| 2017/0244697 | A1 | 8/2017 | Caceres |

FOREIGN PATENT DOCUMENTS

| | | |
|---|---|---|
| CN | 103051510 A | 4/2013 |
| CN | 103441879 A | 12/2013 |
| CN | 105491084 A | 4/2016 |
| JP | 2012-501604 | 1/2012 |
| WO | 2010/025280 | 3/2010 |

OTHER PUBLICATIONS

3GPP TR 33.860, V13.0.2 (Apr. 2016), 3rd Generation Partnership Project; Technical Specification Group Services and System Aspects Study on Enhanced General Packet Radio Service (EGPRS) access security enhancements with relation to cellular Internet of Things (IoT) (Release 13), Apr. 2016, 47 pages.
3GPP TS 44.064, V13.0.0 (Dec. 2015), 3rd Generation Partnership Project; Technical Specification Group Core Network and Terminals; Mobile Station—Serving GPRS Support Node (MS-SGSN); Logical Link Control (LLC) layer specification (Release 13), Dec. 2015, 64 pages.
3GPP TS 43.020, V13.2.0 (Jun. 2016), 3rd Generation Partnership Project; Technical Specification Group Services and System Aspects; Security related network functions (Release 13), Jun. 2016, 123 pages.
3GPP TS 43.020, V14.0.0 (Sep. 2016), 3rd Generation Partnership Project; Technical Specification Group Services and system Aspects; Security related network functions (Release 14), Sep. 2016, 126 pages.
3GPP TS 44.064, V13.4.0 (Mar. 2017), 3rd Generation Partnership Project; Technical Specification Group Core Network and Terminals; Mobile Station—Serving GPRS Support Node (MS-SGSN); Logical Link Control (LLC) layer specification (Release 13), Mar. 2017, 69 pages.
3GPP TS 44.064, V11.0.0 (Jun. 2012), 3rd Generation Partnership Project; Technical Specification Group Core Network and Terminals; Mobile Station—Serving GPRS Support Node (MS-SGSN); Logical Link Control (LLC) layer specification (Release 11), Jun. 2012, 64 pages.
3GPP TR 33.860, V0.3.0 (Aug. 2015), 3rd Generation Partnership Project; Technical Specification Group Services and System Aspects Study on EGPRS Access Security Enhancements with relation to cellular IoT (Release 13), Aug. 2015, 22 pages.
3GPP TS 24.008, V12.2.0 (Jun. 2013), 3rd Generation Partnership Project; Technical Specification Group Core Network and Terminals; Mobile radio interface Layer 3 specification; Core network protocols; Stage 3 (Release 12), Jun. 2013, 682 pages.
3GPP TS 44.064, V13.1.0 (Jun. 2016), 3rd Generation Partnership Project; Technical Specification Group Core Network and Terminals; Mobile Station—Serving GPRS Support Node (MS-SGSN); Logical Link Control (LLC) layer specification (Release 13), Jun. 2016, 67 pages.
ETSI TS 144 064 V13.1.0 (Aug. 2016), Digital cellular telecommunications system (Phase 2+) (GSM); Mobile Station—Serving GPRS Support Node (MS-SGSN); Logical Link Control (LLC) Layer Specification (3GPP TS 44.064 version 13.1.0 Release 13), Aug. 2016 (69 pages).
3GPP TR 33.860 V13.1.0 (Jun. 2016), 3rd Generation Partnership Project; Technical Specification Group Services and System Aspects; Study on Enhanced General Packet Radio Service (EGPRS) access security enhancements with relation to cellular Internet of Things (IoT), (Release 13), Jun. 2016 (46 pages).

* cited by examiner

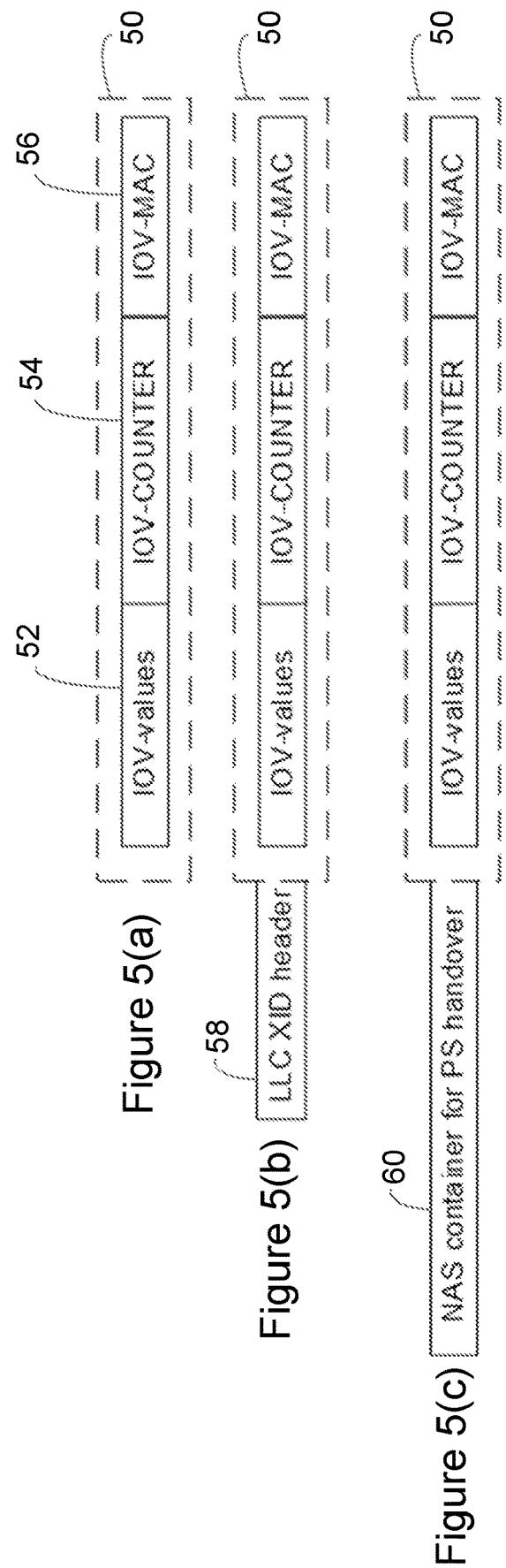

SECURITY OF CIPHERING AND INTEGRITY PROTECTION

CROSS-REFERENCE TO RELATED APPLICATIONS

This application is a continuation of U.S. patent application Ser. No. 16/318,620, having a 371(c) date of Jan. 17, 2019, which is the U.S. National Stage of International Patent Application No. PCT/EP2017/063454, filed Jun. 2, 2017, designating the United States and claiming priority to Chinese Application No. PCT/CN2016/090265, filed on Jul. 18, 2016. The above identified applications are incorporated by this reference.

TECHNICAL FIELD

This invention relates to a method of operation of a terminal device and a network node in a cellular communications network.

BACKGROUND

The Cellular Internet of Things (CIoT) is a new radio technology that is able to provide extended coverage for harsh environments, for example, basements, and is designed to serve massive number of User Equipment devices (UEs) (for example over 50,000 per base station) using a very limited bandwidth (e.g. 160 bps).

The security mechanism for CIoT over GSM EDGE Radio Access Network (GERAN) may be based on enhancements of General Packet Radio Service (GPRS) security as introducing integrity protection for the control plane in Gb mode between the CIoT user equipment and the Serving GPRS Support Node (SGSN).

In this case, the Universal Mobile Telecommunications System (UMTS) Authentication and Key Agreement (AKA) may be run at the GPRS Mobility Management and Session Management (GMM/SM) layer creating the keying material, and the integrity protection may be done at the Logical Link Control (LLC) layer using the integrity key (Kti128) created with the key derivation function from the UMTS AKA session keys.

This application of the General Packet Radio Service (GPRS) security protocols, and other such applications, rely on the use of an Input Offset Value (IOV) as an LLC layer parameter for ciphering. The IOV is a random number that is generated by the SGSN and transmitted to the UE. IOV values can be securely delivered to the UE unprotected right after a successful authentication. However, an attacker may attempt to fool a UE to re-use old IOV values (for example by means of a replay attack, or a false base-station attack).

SUMMARY

An object of the present invention is to reduce the impact and/or the possibility of attempted attacks, for example replay attacks and false base-station attacks.

According to the present invention, there is provided a method of operation of a network node in a cellular communication network. The method comprises: generating at least one new Input Offset Value, IOV, value for use in protecting communications between the network node and a mobile station; associating a fresh counter value with the or each new IOV value; calculating a Message Authentication Code based on at least the at least one new IOV value, the fresh counter value associated with the or each new IOV value, and a constant indicating that the Message Authentication Code is calculated to protect the new IOV value; and transmitting the at least one new IOV value, the fresh counter value, and the calculated Message Authentication Code to the mobile station.

According to the present invention, there is provided a network node for use in a cellular communication network, the network node being configured to operate according to the method defined above.

According to the present invention, there is provided a network node for use in a cellular communications network. The network node comprises a processor and a memory. The memory contains instructions executable by the processor, such that the network node is operable to: generate at least one new Input Offset Value, IOV, value for use in protecting communications between the network node and a mobile station; associate a fresh counter value with the or each new IOV value; calculate a Message Authentication Code based on at least the at least one new IOV value, the fresh counter value associated with the or each new IOV value, and a constant indicating that the Message Authentication Code is calculated to protect the new IOV value; and transmit the at least one new IOV value, the fresh counter value associated with the or each new IOV value, and the calculated Message Authentication Code to the mobile station.

According to the present invention, there is provided a network node for use in a cellular communications network, comprising: a generation module for generating at least one new Input Offset Value, IOV, value for use in protecting communications between the network node and a mobile station; an associating module for associating a fresh counter value with the or each new IOV value; a calculation module for calculating a Message Authentication Code based on at least the at least one new IOV value, the fresh counter value associated with the or each new IOV value, and a constant indicating that the Message Authentication Code is calculated to protect the new IOV value; and a transmission module for transmitting the at least one new IOV value, the fresh counter value associated with the or each new IOV value, and the calculated Message Authentication Code to the mobile station.

According to the present invention, there are provided a computer program configured, when run on a computer, to carry out a method as defined above, and a computer program product comprising a computer readable medium and such a computer program.

According to the present invention, there is provided a method of operation of a mobile station in a cellular communication network. The method comprises: receiving from a network node at least one new Input Offset Value, IOV, value for use in protecting communications between the mobile station and the network node, a counter value associated with the new IOV value, and a Message Authentication Code; calculating an Expected Message Authentication Code based on at least the received new IOV value, the received counter value, and a constant indicating that the Expected Message Authentication Code is calculated to protect the new IOV value; verifying that the counter value is a fresh value; determining whether the received Message Authentication Code matches the calculated Expected Message Authentication Code; and using the new IOV value in protecting communications between the mobile station and the network node if the received Message Authentication Code matches the calculated Expected Message Authentication Code.

According to the present invention, there is provided a mobile station for use in a cellular communication network, the mobile station being configured to operate in accordance with such a method.

According to the present invention, there is provided a mobile station for use in a cellular communication network. The mobile station comprises a processor and a memory. The memory contains instructions executable by the processor, such that the mobile station is operable to: receive from a network node at least one new Input Offset Value, IOV, value for use in protecting communications between the mobile station and the network node, a counter value associated with the new IOV value, and a Message Authentication Code; calculate an Expected Message Authentication Code based on at least the received new IOV value, the received counter value, and a constant indicating that the Expected Message Authentication Code is calculated to protect the new IOV value; verify that the counter value is a fresh value; determine whether the received Message Authentication Code matches the calculated Expected Message Authentication Code; and use the new IOV value for use in protecting communications between the mobile station and the network node if the received Message Authentication Code matches the calculated Expected Message Authentication Code.

According to the present invention, there is provided a mobile station for use in a cellular communication network, the mobile station comprising: a receiving module for receiving from a network node at least one new Input Offset Value, IOV, value for use in protecting communications between the mobile station and the network node, a counter value associated with the new IOV value, and a Message Authentication Code; a calculating module for calculating an Expected Message Authentication Code based on at least the received new IOV value, the received counter value, and a constant indicating that the Expected Message Authentication Code is calculated to protect the new IOV value; a verifying module for verifying that the counter value is a fresh value; a determining module for determining whether the received Message Authentication Code matches the calculated Expected Message Authentication Code; and a protecting module for using the new IOV value for protecting communications between the mobile station and the network node if the received Message Authentication Code matches the calculated Expected Message Authentication Code.

According to the present invention, there are provided a computer program configured, when run on a computer, to carry out a method as defined above, and a computer program product comprising a computer readable medium and such a computer program.

According to the present invention there is also provided a method performed by a mobile station. The method comprises: receiving from a network node at least one new Input Offset Value, IOV value, for use in protecting communications between the mobile station and the network node, an IOV counter value, and a Message Authentication Code; calculating an Expected Message Authentication Code based on at least the received new IOV value, the received IOV counter value, and a constant indicating that the Expected Message Authentication Code is calculated to protect the new IOV value; verifying that the received IOV counter value is larger than an IOV counter value locally stored in the mobile station; determining whether the received Message Authentication Code matches the calculated Expected Message Authentication Code; and using the new IOV value for protecting communications between the mobile station and the network node if the received Message Authentication Code matches the calculated Expected Message Authentication Code and if the received IOV counter value is larger than the IOV counter value locally stored in the mobile station.

According to the present invention there is also provided a method performed by a network node in a cellular communication network. The method comprises: generating at least one new Input Offset Value, IOV value, for use in protecting communications between the network node and a mobile station; calculating a Message Authentication Code based on at least the at least one new IOV value, an incremented IOV counter value, and a constant indicating that the Message Authentication Code is calculated to protect the new IOV value; and transmitting the at least one new IOV value, the IOV counter value, and the calculated Message Authentication Code to the mobile station.

This has the advantage that an attacker cannot successfully replay old IOV values to a UE and compromise the security of transmissions.

BRIEF DESCRIPTION OF THE DRAWINGS

FIGS. 5(a), 5(b), and 5(c) illustrate forms of information transferred in the network of FIG. 1.

DETAILED DESCRIPTION

Figure 1:
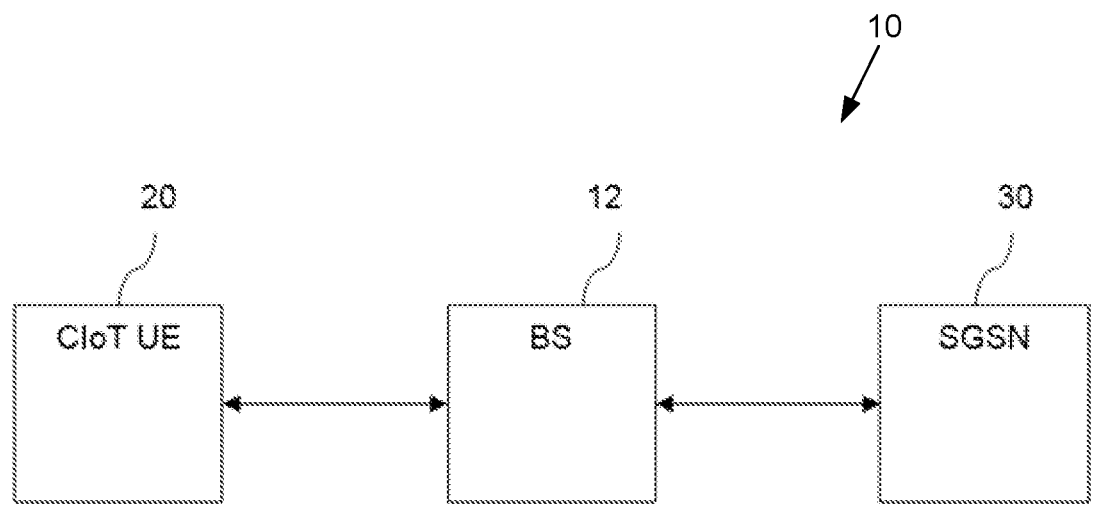
FIG. 1 illustrates a part of a cellular communications network.

The following sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for user equipment (UE), it should be understood by the skilled in the art that "UE" is a non-limiting term comprising any mobile or wireless device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the terms "mobile station" ("MS"), "mobile device" and "terminal device" may be used interchangeably in the following description, and it will be appreciated that such a device does not necessarily have to be 'mobile' in the sense that it is carried by a user. Instead, the term "mobile device" encompasses any device that is capable of communicating with communication networks that operate according to one or more mobile communication standards, such as the Global System for Mobile communications, GSM, UMTS, Long-Term Evolution, LTE, IEEE 802.11 or 802.16, etc as well as any future generation mobile communication standards, e.g 5G and what we today call Internet of Things (IoT).

A cell is associated with a base station, where a base station comprises in a general sense any network node transmitting radio signals in the downlink (DL) and/or receiving radio signals in the uplink (UL). Some example base stations, or terms used for describing base stations, are eNodeB, eNB, NodeB, macro/micro/pico/femto radio base station, home eNodeB (also known as femto base station), relay, repeater, sensor, transmitting-only radio nodes or receiving-only radio nodes, or WLAN access point (AP). A base station may operate or at least perform measurements in one or more frequencies, carrier frequencies or frequency bands and may be capable of carrier aggregation. It may also be a single-radio access technology (RAT), multi-RAT, or multi-standard node, e.g., using the same or different base band modules for different RATs.

FIG. 1 illustrates a part of a network 10. The network 10 comprises a basestation 12 connected to a Cellular Internet of Things (CIoT) terminal device (UE) 20 and a network node. In illustrated embodiments, the network node is a Serving GPRS Support Node (SGSN) 30, which may be an Enhanced SGSN (eSGSN). Of course, a network will typically include many basestations, and a very large number of terminal devices, but the present FIG. 1 is sufficient for an understanding of the present invention. The terminal device may be a user equipment device or may be a device that connects automatically to the network as required, and may be fixed or portable. The terms user equipment (UE) and mobile station (MS) are both used herein to refer to the terminal device.

Figure 2:
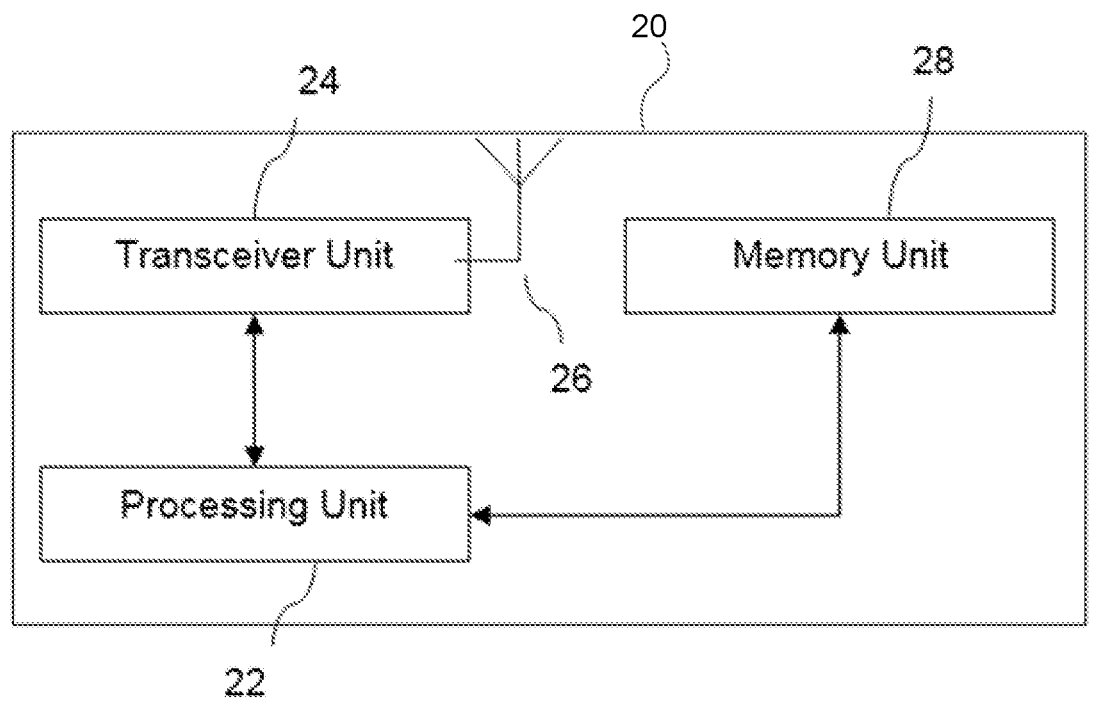
FIG. 2 illustrates a terminal device in the network of FIG. 1.

FIG. 2 shows a terminal device (UE) 20 that can be adapted or configured to operate according to one or more of the non-limiting example embodiments described. The UE 20 comprises a processor or processing unit 22 that controls the operation of the UE 20. The processing unit 22 is connected to a transceiver unit 24 (which comprises a receiver and a transmitter) with associated antenna(s) 26 which are used to transmit signals to and receive signals from a base station 12 in the network 10. The UE 20 also comprises a memory or memory unit 28 that is connected to the processing unit 22 and that contains instructions or computer code executable by the processing unit 22 and other information or data required for the operation of the UE 20 in accordance with the methods described herein. The terminal device is also referred to herein as a mobile station (MS).

Figure 3:
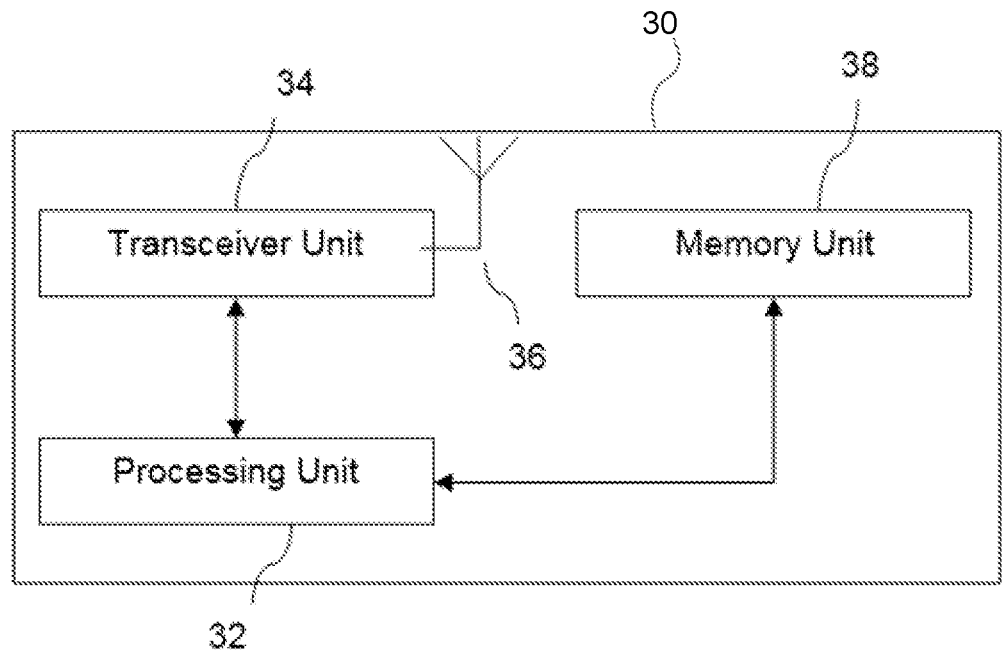
FIG. 3 illustrates a network node in the network of FIG. 1.

FIG. 3 shows a Serving GPRS Support Node (SGSN) 30 that can be adapted or configured to operate according to one or more of the non-limiting example embodiments described. The SGSN 30 comprises a processor or processing unit 32 that controls the operation of the SGSN 30. The processing unit 32 is connected to a transceiver unit 34 (which comprises a receiver and a transmitter) which is used to transmit signals to and receive signals from terminal device(s) 20, via basestations 12 in the network 10. The SGSN 30 also comprises a memory or memory unit 38 that is connected to the processing unit 32 and that contains instructions or computer code executable by the processing unit 32 and other information or data required for the operation of the SGSN 30 in accordance with the methods described herein.

Encryption (also known as ciphering) of control signaling and user plane data is optional in the 2G General Packet Radio Service (GPRS). Also, integrity protection is not provided. This causes several potential security issues that are more problematic in the context of the Cellular Internet of Things (CIoT) than in the normal GSM/GPRS context. For example, there is a problem of a "bidding down" attack which could potentially allow an attacker to turn off the encryption. This may lead to a problem of the loss of confidentiality but also more severe problems, such as allowing an attacker to detach the CIoT UE from the network, and in this way leaving the CIoT UE without network connection. The CIoT UE would need to recover from such situation without human assistance. There is also a risk that the CIoT UE may be tricked to perform a Denial of Service attack towards the network if security enhancements are not specified. Furthermore, the attacker could potentially force the CIoT UE and the network to run authentication more frequently than necessary and in this way consume the battery of the CIoT UE.

One solution to these issues is therefore to introduce integrity protection. Integrity protection could be supported by the LLC layer in order to be able to integrity protect layer 3 control signaling messages such as for example GMM messages, SM messages, Short Message Service (SMS), and user plane data.

In order to provide integrity protection, the CIoT UE and SGSN may negotiate which integrity algorithm and encryption algorithm to use for security protection of layer 3 signaling information and user plane data when the CIoT UE initiates GMM Attach procedure in order to register in the 3GPP network. The CIoT UE may therefore send the identifiers of the supported integrity protection algorithms together with the supported encryption algorithms to the SGSN in its security capability indication (CIoT UE's security capabilities), when it attaches to the network and initiates a GMM Attach Request message. The CIoT UE's security capabilities could be indicated for example in 'MS network capability' or in a new UE capability indication.

In order that the GMM Attach Request message can be protected between the CIoT UE and the SGSN, it is proposed that the SGSN should echo the CIoT UE's security capabilities received in GMM Attach Request message, back to the CIoT UE in an integrity protected GMM message (e.g. GMM Authentication and Ciphering Request message or any new GMM message), so that the CIoT UE is able to check if the received CIoT UE's security capabilities match with the CIoT UE's security capability it sent in GMM Attach Request message to the SGSN, in order to conclude that no bidding down attack has taken place. This is similar to what is done in the existing protocols for 3G/UMTS and LTE.

The SGSN also selects a common encryption algorithm and a common integrity protection algorithm based on the support algorithms indicated in CIoT UE's security capabilities from CIoT UE in GMM Attach Request message. Therefore the SGSN can indicate the selected algorithms in an integrity protected GMM message (e.g. GMM Authentication and Ciphering Request message or any new GMM message) to the CIoT UE.

Figure 4:
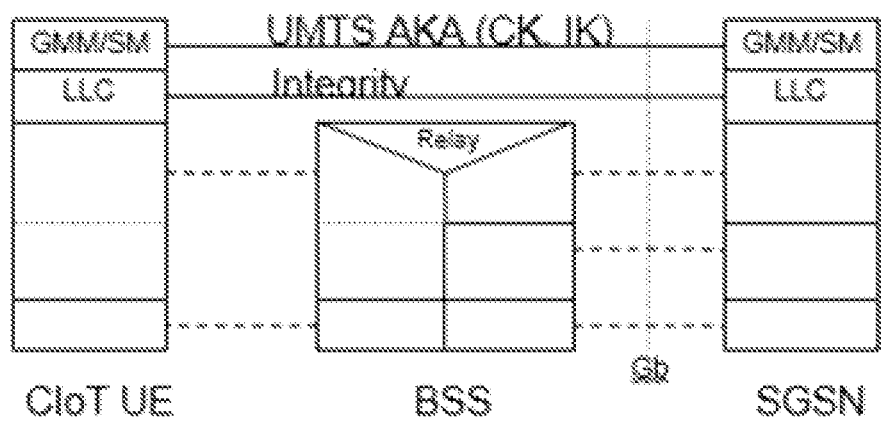
FIG. 4 illustrates protocols in use in the network of FIG. 1.

FIG. 4 illustrates a protocol layer control plane in Gb mode, that is, over the Gb interface.

As can be seen from this figure, the Universal Mobile Telecommunications System (UMTS) Authentication and Key Agreement (AKA) is run at the GPRS Mobility Management and Session Management (GMM/SM) layer creating the keying material Cipher Key (CK) and Integrity Key (IK). The integrity protection is done at the Logical Link Control (LLC) layer using an integrity key Ki128 that is created with the key derivation function from the UMTS AKA session keys CK/IK.

In examples described herein, a secure IOV container is used to securely deliver IOV-values to the UE. For example, a new IOV value or values may be needed every time the UE is re-authenticated, the algorithm used to protect the messages (using integrity protection and/or encryption) is changed, or a new SGSN (without re-authentication) is involved.

FIG. 5(a) shows a first message format for transmission of this secure IOV container. Specifically, the secure IOV container 50 includes one or more new IOV values 52, an IOV counter value 54, and an IOV Message Authentication Code (MAC) 56.

FIG. 5(b) shows a second message format for transmission of this secure IOV container. Specifically, the same secure IOV container 50, including the new IOV values, an IOV counter value, and an IOV Message Authentication Code (MAC) is carried in an LLC Exchange Identification (XID) message, and therefore the message has an LLC XID header 58.

FIG. 5(c) shows a third message format for transmission of this secure IOV container. Specifically, the same secure IOV container 50 including the new IOV values, an IOV counter value, and an IOV Message Authentication Code (MAC) is carried in a Non-Access Stratum (NAS) container for Packet Switched (PS) handover message 60.

In each of these examples, the secure IOV container 50 includes at least one new IOV value 52. The IOV values are specific to the frame type and to the algorithm type in which they will be used. For example, the IOV values may include IOV-UI, which is the IOV value for an encryption algorithm using UI frames; i-IOV-UI, which is the IOV value for an integrity algorithm using UI frames; IOV-I, which is the IOV value for an encryption algorithm using I frames; and/or i-IOV-I, which is the IOV value for an integrity algorithm using I frames.

Typically, the container includes only values for one frame type. That is the container may include IOV-UI, and/or i-IOV-UI, or it may include IOV-I, and/or i-IOV-I.

In some embodiments, it is required to use integrity protection, and so the container will include i-IOV-UI or i-IOV-I, depending on the frame type. However, encryption may be optional, and so IOV-UI or IOV-I may or may not be included.

In addition, in each of these examples, the secure IOV container 50 includes an IOV counter value 54. In these examples, this is an LLC layer counter that is maintained both in the MS and in the SGSN, and is incremented every time new IOV-values are transmitted from the SGSN to the MS. The counter is reset to a predetermined value after a successful authentication. For example, the counter may be reset to zero after a successful authentication. Alternatively, when an authentication occurs, the IOV counter value could be set equal to a non-zero value, which may for example be a value obtained during the authentication process, such as an authentication request value RAND (Random challenge) or a fragment of the authentication request value RAND that was sent in the AKA authentication challenge.

The IOV counter may be stored in non-volatile memory in the MS at detach and power-off, so that it can be used by the MS when attached and powered-on again.

The GMM layer may indicate to the LLC layer when the counter shall be reset.

In addition, in each of these examples, the secure IOV container 50 includes an IOV Message Authentication Code (MAC) 56.

Figures 6, 7:
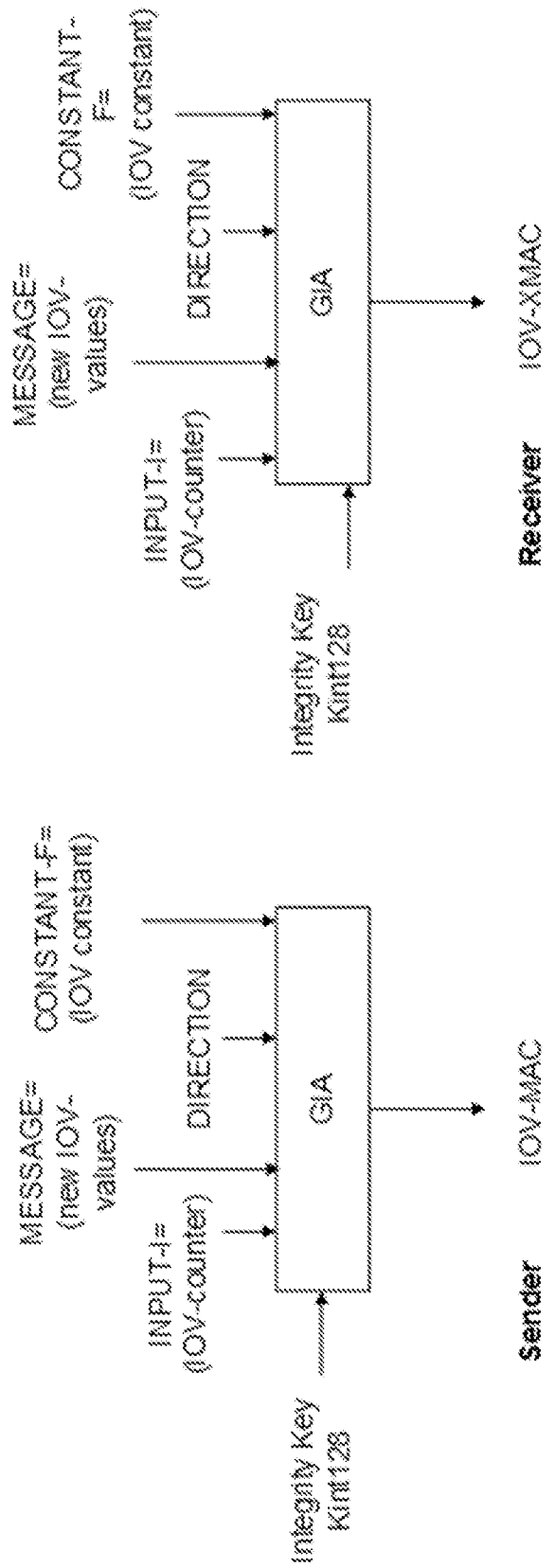
FIG. 6 illustrates a first process of forming a part of the information of FIG. 5.
FIG. 7 illustrates a second process performed when receiving the information of FIG. 8.

FIG. 6 illustrates one possible method for generating a MAC (called IOV-MAC in the figure, and also may be called MAC-IOV) at a transmitter/sender, which may be either a terminal device or a network node.

Specifically, FIG. 6 shows a GPRS integrity algorithm (GIA), which receives five input parameters.

A first input parameter of the integrity algorithm is the integrity key Ki128 (Kint 128 in FIG. 6), which may be derived from the encryption and authentication keys, either in a terminal device or in a network node, by running the Universal Mobile Telecommunications System (UMTS) Authentication and Key Agreement (AKA), as described in the 3GPP Technical Report 3GPP TR 33.860 V0.4.0. In some embodiments, different integrity keys may be used for different frame types, for example a first integrity key (IK-I) for I-frames and a second integrity key OK-Up for UI-frames.

The second input parameter is an integrity input (Input-I). In this case, the IOV-counter is used as the Input-I.

The message to be transmitted is also applied to the integrity algorithm (GIA) as a third input. In this case, the message contains the IOV values 52 as shown in FIG. 5.

The constant value (denoted CONSTANT-F=IOV constant in FIG. 6) is also applied to the integrity algorithm (GIA) as a fourth input. The constant identifies that the MAC is being calculated for the IOV container which carries the IOV value that should be protected. In other words, it can equally be said that the MAC is being calculated for that IOV value. The constant value as input may be set to a unique number to distinguish it from other MACs. An example may be to utilize an 8-bit input value called FRAMETYPE, which for the LLC layer for MAC-IOV may be set to 0b11111110 (254). The constant value may be a 32-bit parameter where the FRAMETYPE is expanded by setting the 24 most significant bits to zero: 0 . . . 0||FRAMETYPE.

A transfer direction (Direction) may be used as a fifth input parameter. The Direction may be 1 bit with 0 for uplink and 1 for downlink, but it may also always be set to 1.

At the transmitter, the integrity algorithm produces the Message Authentication Code (MAC) as an output parameter. The MAC can then be transmitted with the message.

FIG. 7 illustrates a method comprising the generation of an Expected Message Authentication Code (XMAC) at a receiver, which again may be either a terminal device or a network node.

As in FIG. 6, FIG. 7 shows the GPRS integrity algorithm (GIA) receiving five input parameters.

As in FIG. 6, the first input parameter of the integrity algorithm is the integrity key Ki128 (Kint128 in FIG. 7), which may be derived from the encryption and authentication keys, either in a terminal device or in a network node, by running the Universal Mobile Telecommunications System (UMTS) Authentication and Key Agreement (AKA), as described in the 3GPP Technical Report 3GPP TR 33.860 V0.4.0.

The second input parameter is an integrity input (Input-1), which is the IOV counter value that is sent within the IOV container, and an expected value is known to the receiver.

The message to be transmitted is also applied to the integrity algorithm (GIA) as a third input. In this case, the message contains the IOV values 52 and the IOV counter value 54 as shown in FIG. 5.

The constant value is also applied to the integrity algorithm (GIA) as a fourth input as shown in FIG. 6. The constant identifies that the MAC is being calculated for the IOV container/IOV value.

Again, as in FIG. 6, a transfer direction (Direction) may be used as a fifth input parameter.

At the receiver, the integrity algorithm is used to generate the Expected Message Authentication Code (XMAC) as an output parameter. The XMAC can then be compared with the MAC that was transmitted with the message, in order to check that these are equal. If they are equal, this confirms the authenticity of the message.

The GIA may be e.g. GIA4 based on Kasumi 128 or GIA5 based on SNOW 3G.

Figure 8:
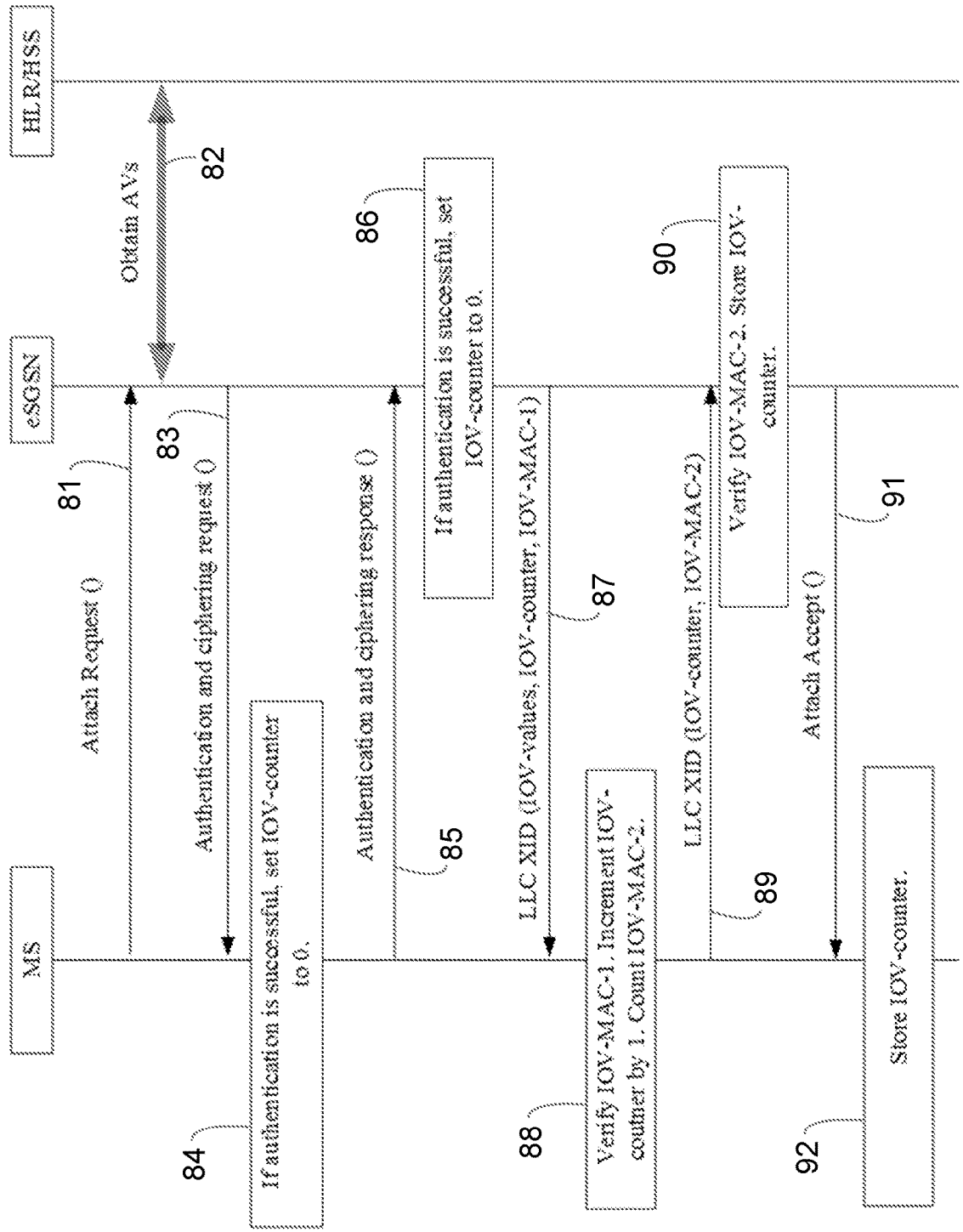
FIG. 8 is a flow chart illustrating a method.

FIG. 8 is a flow chart showing a method that involves delivering a new IOV value to a mobile station (MS) in an Enhanced GPRS network by way of one example.

In step 81, the MS sends an Attach Request message to the eSGSN, i.e. the Enhanced SGSN of an Enhanced GPRS network. In response, as shown at 82, the eSGSN performs a process for obtaining Authentication vectors (AV) from the Home Location Register/Home Subscriber Server (HLR/HSS).

In step 83, the eSGSN sends an authentication and ciphering request to the MS. If the authentication is successful then, at step 84, the MS sets its IOV counter value to a predetermined value, which in this example is zero.

Then, at step 85, the MS sends its authentication and ciphering response to the eSGSN. If the authentication is successful then, at step 86, the eSGSN sets its IOV counter value to the same predetermined value as was used by the MS in step 84, namely zero in this example.

The eSGSN then generates at least one new IOV value. At step 87, the eSGSN then sends a message to the MS, containing the at least one new IOV value. In some embodiments, it will be required to use integrity protection, and so it will be necessary to send an IOV value for integrity protection. If null-encryption is used, then it will only be necessary to send an IOV value for integrity protection. However, if encryption is used, then an IOV value for use in encryption may also be transmitted.

In this example, the message is an LLC XID message as shown in FIG. 5(b), and includes an LLC XID header, as well as the new IOV values, an IOV counter value, and an IOV Message Authentication Code (MAC). In this example, the IOV Message Authentication Code, having the value IOV-MAC-1 is calculated on the basis of at least the new IOV value sent in this message, the IOV counter value, and a constant (showing the MAC is calculated for an IOV container message.

In step 88, the MS receives the message sent by the eSGSN, and attempts to verify the Message Authentication Code. Specifically, the MS checks that its locally maintained value of the IOV counter is smaller than the IOV counter value received in the message sent by the eSGSN. If the local value is larger than or equal to the received value, the message is discarded. In other words, if the received IOV counter value is greater than the locally maintained IOV counter, then the received IOV counter value is acceptable, but if the received IOV counter value is smaller or equal to the locally maintained IOV counter, then the message is discarded. The MS calculates an Expected Message Authentication Code, or XMAC, on the basis of the same parameters that were used by the eSGSN to calculate IOV-MAC-1, namely the new IOV value that was included in the message sent by the eSGSN, and the IOV counter value that was also included in the message sent by the eSGSN, and the constant showing the MAC is calculated for an IOV container message. If the message was authentic, then the XMAC calculated by the MS should be the same as the MAC included in the message sent by the eSGSN, that is, it should also be equal to IOV-MAC-1.

The MS can thus determine that the new IOV value or values that it has received are indeed new, and are not old IOV values that have been replayed by an attacker. The new IOV value or values can then be used to protect future communication, for example by means of integrity protection, and optionally also by means of encryption.

Also in step 88, the MS updates the current value of the IOV counter value. The MS replaces its locally maintained value of the IOV counter with the value received in the message sent by the eSGSN, and increments it by one. This deals with the special case in which a message has been lost, and the MS receives a counter value that is larger than its previously stored counter value, and therefore larger than it expects.

The counter value is preferably stored in non-volatile memory at detach and power off, so that it is available for use at power on and re-attach.

The MS then calculates a new value IOV-MAC-2 for the Message Authentication Code, or MAC, on the basis of the new IOV value that was sent by the eSGSN to the MS, the newly incremented IOV counter value and the constant showing the MAC was calculated for IOV container message.

At step 89, the MS transmits an LLC XID message to the eSGSN, containing the newly incremented counter value and also containing this new value IOV-MAC-2 for the Message Authentication Code.

At step 90, the eSGSN receives the message sent by the MS, and attempts to verify the Message Authentication Code. Specifically, the eSGSN calculates an Expected Message Authentication Code, or XMAC, on the basis of the same parameters that were used by the MS to calculate IOV-MAC-2, namely the new IOV value that was previously sent by the eSGSN to the MS, the newly incremented IOV counter value that was sent within the message sent by the MS, and the constant showing the MAC was calculated for IOV container message.

If the message was authentic, then the IOV counter value sent within the message should be bigger than the locally maintained value within the eSGSN, and the XMAC calculated by the eSGSN should be the same as the MAC included in the message sent by the MS, that is, it should also be equal to IOV-MAC-2.

If this is correct, the eSGSN replaces its locally maintained value of the IOV counter with the value received in the message sent by the MS, and increments it by one.

At step 91, the SGSN sends an Attach Accept message to the MS. At step 92, the MS stores the incremented IOV counter value. Thus, the eSGSN is able to send the new IOV value to the MS in a secure way.

Figure 9:
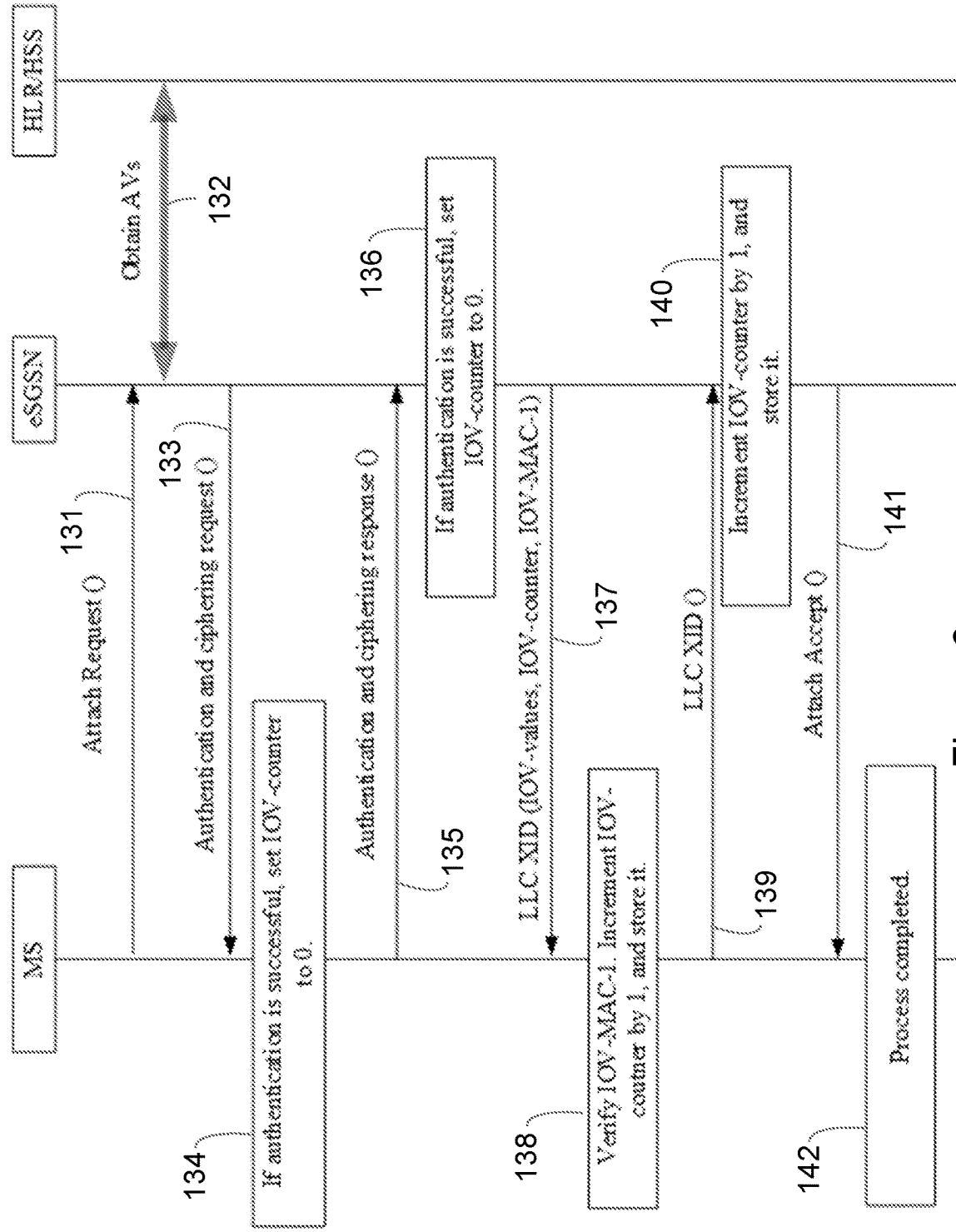
FIG. 9 is a flow chart illustrating a method.

FIG. 9 is a flow chart showing a method that involves delivering a new IOV value to a mobile station (MS) in an Enhanced GPRS network by way of an alternative example.

In step 131, the MS sends an Attach Request message to the eSGSN, i.e. the Enhanced SGSN of an Enhanced GPRS network. In response, as shown at 132, the eSGSN performs a process for obtaining Authentication vectors (AV) from the Home Location Register/Home Subscriber Server (HLR/HSS).

In step 133, the eSGSN sends an authentication and ciphering request to the MS. If the authentication is successful then, at step 134, the MS sets its IOV counter value to a predetermined value, which in this example is zero.

Then, at step 135, the MS sends its authentication and ciphering response to the eSGSN. If the authentication is successful then, at step 136, the eSGSN sets its IOV counter value to the same predetermined value as was used by the MS in step 84, namely zero in this example.

The eSGSN then generates at least one new IOV value. At step 137, the eSGSN then sends a message to the MS, containing the at least one new IOV value. In some embodiments, it will be required to use integrity protection, and so it will be necessary to send an IOV value for integrity protection. If null-encryption is used, then it will only be necessary to send an IOV value for integrity protection. However, if encryption is used, then an IOV value for use in encryption may also be transmitted.

In this example, the message is an LLC XID message as shown in FIG. 5(*b*), and includes an LLC XID header, as well as the new IOV values, an IOV counter value, and an IOV Message Authentication Code (MAC). In this example, the IOV Message Authentication Code, having the value IOV-MAC-1 is calculated on the basis of at least the new IOV value sent in this message, the IOV counter value, and a constant showing the MAC is calculated for an IOV container message.

In step 138, the MS receives the message sent by the eSGSN, and attempts to verify the Message Authentication Code. Specifically, the MS checks that its locally maintained value of the IOV counter is smaller than the IOV counter value received in the message sent by the eSGSN. If the local value is larger than or equal to the received value, the message is discarded. The MS calculates an Expected Message Authentication Code, or XMAC, on the basis of the same parameters that were used by the eSGSN to calculate IOV-MAC-1, namely the new IOV value that was included in the message sent by the eSGSN, and the IOV counter value that was also included in the message sent by the eSGSN, and the constant showing the MAC is calculated for an IOV container message. If the message was authentic, then the XMAC calculated by the MS should be the same as the MAC included in the message sent by the eSGSN, that is, it should also be equal to IOV-MAC-1.

The MS can thus determine that the new IOV value or values that it has received are indeed new, and are not old IOV values that have been replayed by an attacker. The new IOV value or values can then be used to protect future communications, for example by means of integrity protection, and optionally also by means of encryption.

Also in step 138, the MS updates the current value of the IOV counter value. The MS replaces its locally maintained value of the IOV counter with the value received in the message sent by the eSGSN, and increments it by one.

At step 139, the MS transmits an LLC XID message to the eSGSN as an acknowledgement. At step 140, the eSGSN receives the message sent by the MS, increments its IOV counter value by one, and stores the new value. At step 141, the SGSN sends an Attach Accept message to the MS. At step 142, the process is completed. Thus, again, the eSGSN is able to send the new IOV value to the MS in a secure way. In this embodiment, only the messages from the eSGSN towards the MS include a MAC, and the potential response messages are not protected. Since the IOV-MAC-2 is missing, the IOV-counter is not incremented in the MS and eSGSN when the potential response message is sent.

Thus, in this embodiment, while the LLC XID message command sent by the eSGSN to the MS is sent with the IOV-MAC-1, the LLC XID message response sent by the MS to the eSGSN is sent without the IOV-MAC-2.

Another example of a similar embodiment is where the new IOV value or values are sent with the NAS container for PS handover message, as shown in FIG. 5(*c*), and are sent by the eSGSN to the MS with the IOV-MAC-1. The PS handover message does not include a response from the MS, and consequently, as in FIG. 9, the IOV-MAC-2 is not used in this procedure.

Figure 10:
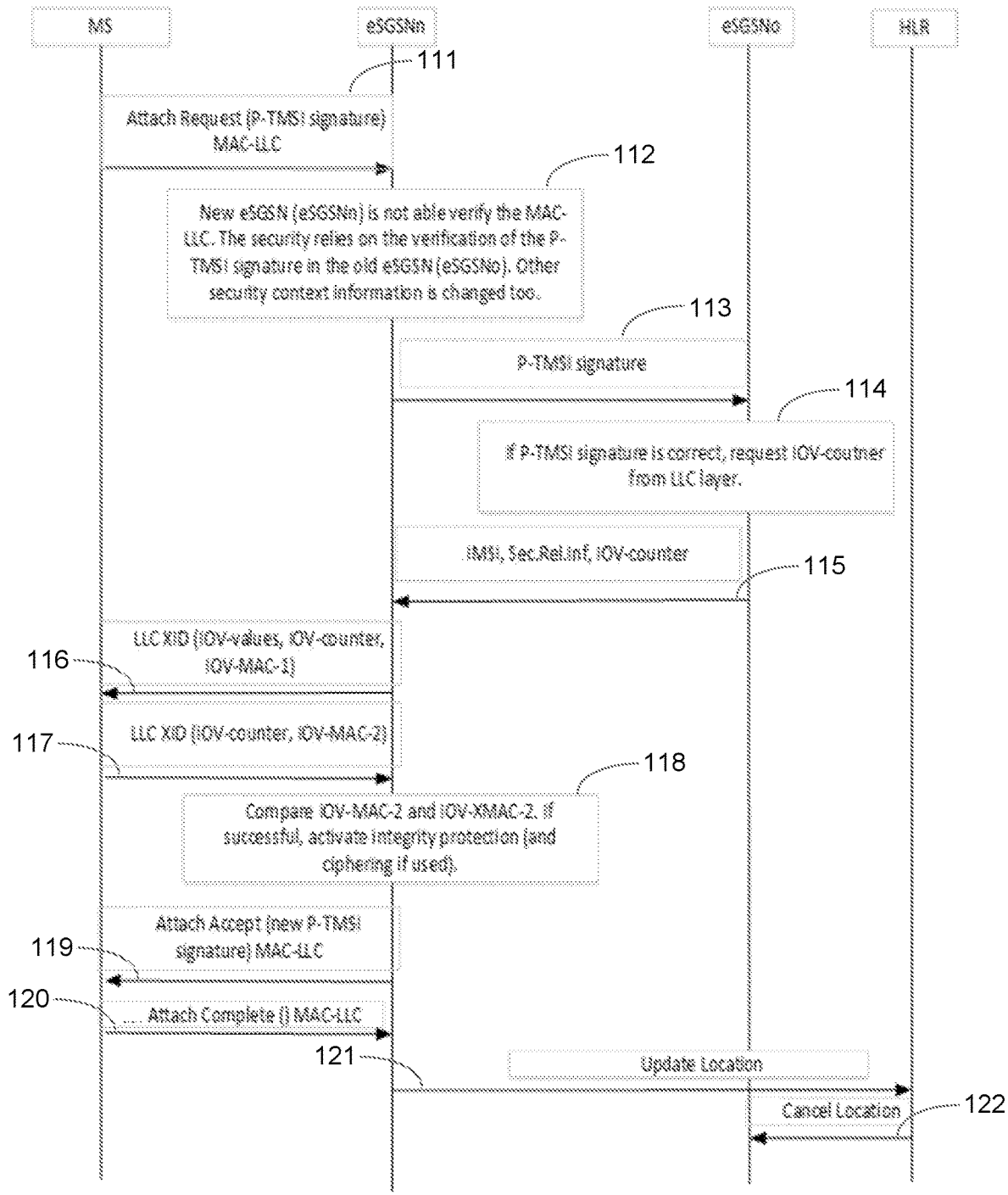
FIG. 10 is a flow chart illustrating a method.

FIG. 10 is a flow chart showing a method that can be used in the case of idle mode mobility, in which, by way of another example, a new eSGSN is involved, and so a new IOV value or values is required. In this example, the new eSGSN can deliver a new IOV value to a mobile station (MS) in an Enhanced GPRS network, even though there is not yet a security association between the MS and the new eSGSN.

FIG. 10 shows a method starting from a situation in which an MS has an IOV-counter value stored in its non-volatile memory when it powers on. At step 111, the MS sends an Attach Request to a new eSGSN, eSGSNn, together with all relevant information including the optional P-TMSI (Packet Temporary Mobile Subscriber Identity) signature. The MS has calculated and attached the MAC-LLC that integrity protects the message.

At step 112, the message is delivered to the new eSGSN. Since the new eSGSN has no valid security association with the user, it is not able to verify the MAC-LLC. The security relies on the verification of the P-TMSI signature in the old eSGSN, eSGSNo. Other security context information is changed too. Therefore, the new eSGSN silently discards the MAC-LLC.

At step 113, the new eSGSN sends a message to the old eSGSN, attaching the P-TMSI signature.

At step 114, the old eSGSN receives the message from the new eSGSN, and verifies the P-TMSI signature. If successful, it requests the current value of the IOV-counter from LLC layer.

At step 115, the old eSGSN returns the IMSI of the MS, security related information (for example such as a security mode, key identifier, indication of ciphering algorithm to use, indication of integrity algorithm to use, unused authentication vectors, an indication whether the MS subscriber profile indicates that user plane integrity is required), and the old IOV-counter to the new eSGSN. If the new eSGSN does not support the indicated algorithms, then it needs to re-authenticate the MS.

At step 116, the GMM layer in the new eSGSN initiates the enhanced LLC XID procedure by giving the old IOV-counter, integrity protection algorithm, the integrity key Ki128 to the LLC layer. The LLC layer sends the enhanced LLC XID message with the new IOV-values, old IOV-counter, and IOV-MAC-1 to the MS. The new IOV-values, and the old IOV-counter are protected by IOV-MAC-1.

At step 117, the LLC layer at the MS verifies that the IOV-counter value carried in the message has a fresh value by comparing it with the IOV-counter it has earlier stored locally. If the value is fresh, it then verifies the IOV-MAC-1 using the security related information it shares with the old eSGSN. If verification is successful, it stores the IOV-counter received in the message, and increments it. It then calculates the IOV-MAC-2 over the new IOV-values received from the new SGSN and the incremented IOV-counter, as described with reference to FIG. 6.

The MS can thus determine that the new IOV value or values that it has received are indeed new, and are not old IOV values that have been replayed by an attacker.

The MS replaces the old IOV-value(s) with the new IOV-value(s) in the LLC layer.

The new IOV value or values can then be used to protect future communications, for example by means of integrity protection, and optionally also by means of encryption.

The LLC layer in the MS sends the enhanced LLC XID message with the incremented IOV-counter and the IOV-MAC-2 back to the new eSGSN.

At step 118, the LLC layer at the new eSGSN verifies that the IOV-counter value carried in the message has a fresh value by comparing it with the IOV-counter it has earlier stored locally. If the value is fresh, it then verifies the IOV-MAC-2 using the security related information it received from the old eSGSN. If verification is successful, it stores the IOV-counter received in the message from the MS, and increments it. If the check is successful, then the new SGSN activates integrity protection and ciphering, if used, in the LLC layer by assigning the old integrity key and old integrity algorithm in the LLC layer.

At step 119, the new eSGSN sends the Attach Accept message including the P-IMSI signature to the MS, integrity protected in the LLC layer.

At step 120, the MS acknowledges the Attach Accept message received from the new eSGSN by sending an Attach Complete message to the new eSGSN.

At step 121, the new eSGSN updates the location of this MS in the HLR, and at step 122 the HLR cancels the location of the MS at the old eSGSN.

Thus, the procedure allows new IOV values to be sent securely from a new eSGSN to an MS, even though there is no security association between the eSGSN and the MS.

Figure 11:
FIG. 11 illustrates a form of network node.
Figure 12:
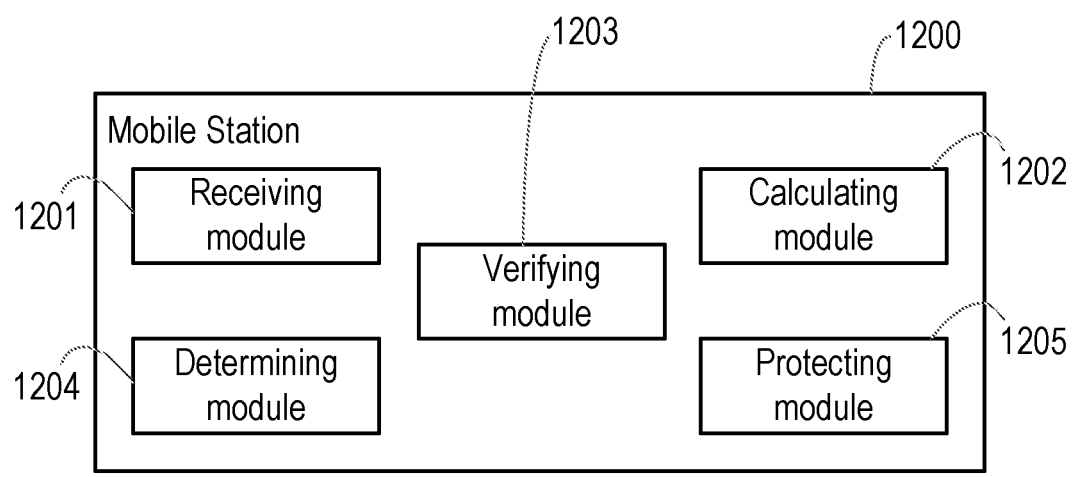
FIG. 12 illustrates a form of mobile station.

FIGS. 11 and 12 illustrate functional units in other embodiments of network nodes 1100 and mobile stations 1200, which may execute any of the methods described herein, for example according to computer readable instructions received from a computer program. It will be understood that the modules illustrated in FIGS. 11 and 12 are software implemented functional units, and may be realised in any appropriate software or combination of software modules.

Referring to FIG. 11, the network node 1100 comprises a generation module 1101 for generating at least one new Input Offset Value, IOV, value for use in protecting communications between the network node and a mobile station. The network node 1100 also includes an associating module 1102 for associating a fresh counter value with the or each new IOV value. The network node 1100 includes a calculation module 1103 for calculating a Message Authentication Code based on at least the at least one new IOV value, the fresh counter value associated with the or each new IOV value, and a constant indicating that the Message Authentication Code is calculated to protect the new IOV value; and a transmission module 1104 for transmitting the at least one new IOV value, the fresh counter value associated with the or each new IOV value, and the calculated Message Authentication Code to the mobile station.

Referring to FIG. 12, a mobile station 1200 comprises a receiving module 1201 for receiving from a network node at least one new Input Offset Value, IOV, value for use in protecting communications between the mobile station and the network node, a counter value associated with the new IOV value, and a Message Authentication Code. The MS 1200 then includes a calculating module 1202 for calculating an Expected Message Authentication Code based on at least the received new IOV value, the received counter value associated with the new IOV value, and a constant indicating that the Expected Message Authentication Code is calculated to protect the new IOV value; a verifying module 1203 for verifying that the counter value associated with the new IOV value is a fresh value; and a determining module 1204 for determining whether the received Message Authentication Code matches the calculated Expected Message Authentication Code. The MS 1200 then includes a protecting module 1205 for using the new IOV value for use in protecting communications between the mobile station and the network node if the received Message Authentication Code matches the calculated Expected Message Authentication Code.

Figure 13:
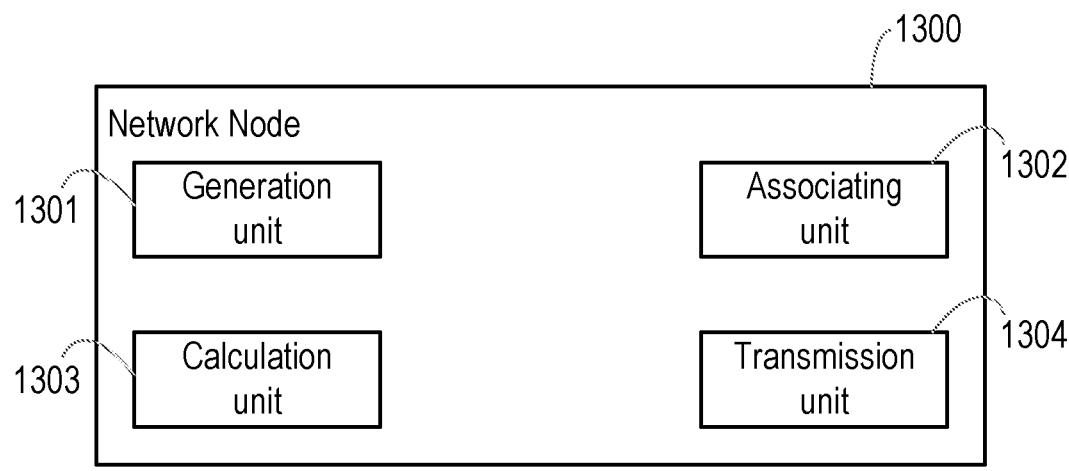
FIG. 13 illustrates a form of network node.
Figure 14:
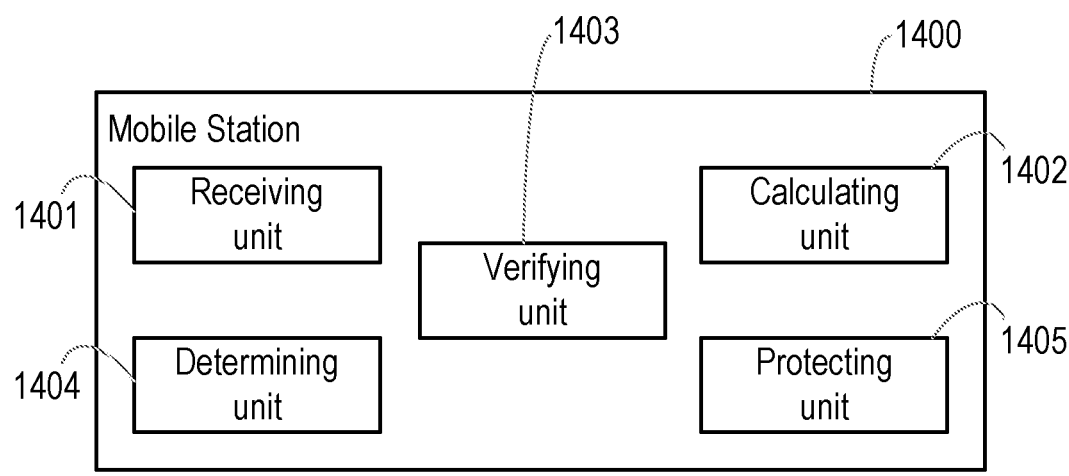
FIG. 14 illustrates a form of mobile station.

FIGS. 13 and 14 illustrate functional units in other embodiments of network nodes 1300 and mobile stations 1400, which may execute any of the methods described herein, for example according to computer readable instructions received from a computer program. It will be understood that the units illustrated in FIGS. 13 and 14 are hardware implemented functional units, and may be realised in any appropriate combination of hardware units.

Referring to FIG. 13, the network node 1300 comprises a generation unit 1301 for generating at least one new Input Offset Value, IOV, value for use in protecting communications between the network node and a mobile station. The network node 1300 also includes an associating unit 1302 for associating a fresh counter value with the or each new IOV value. The network node 1300 includes a calculation unit 1303 for calculating a Message Authentication Code based on at least the at least one new IOV value, the fresh counter value associated with the or each new IOV value, and a constant indicating that the Message Authentication Code is calculated to protect the new IOV value; and a transmission unit 1304 for transmitting the at least one new IOV value, the fresh counter value associated with the or each new IOV value, and the calculated Message Authentication Code to the mobile station.

Referring to FIG. 14, a mobile station 1400 comprises a receiving unit 1401 for receiving from a network node at least one new Input Offset Value, IOV, value for use in protecting communications between the mobile station and the network node, a counter value associated with the new IOV value, and a Message Authentication Code. The MS 1400 then includes a calculating unit 1402 for calculating an Expected Message Authentication Code based on at least the received new IOV value, the received counter value associated with the new IOV value, and a constant indicating that the Expected Message Authentication Code is calculated to protect the new IOV value; a verifying unit 1403 for verifying that the counter value associated with the new IOV value is a fresh value; and a determining unit 1404 for determining whether the received Message Authentication Code matches the calculated Expected Message Authentication Code. The MS 1400 then includes a protecting unit 1405 for using the new IOV value for use in protecting communications between the mobile station and the network node if the received Message Authentication Code matches the calculated Expected Message Authentication Code.

There are thus described methods of operation of a terminal device and a network node that allow for improved security.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A method of operation of a network node in a cellular communication network, the method comprising:
generating at least one new input offset value (IOV) value for use in protecting communications between the network node and a mobile station;
associating a fresh counter value with the or each new IOV value;
calculating a message authentication code based on at least the at least one new IOV value, the fresh counter value associated with the or each new IOV value, and a constant indicating that the message authentication code is calculated to protect the new IOV value; and
transmitting to the mobile station a message comprising a container that includes the at least one new IOV value, the fresh counter value, and the calculated message authentication code.

2. The method of claim 1, wherein the new IOV is for use in integrity protection of communications between the network node and the mobile station.

3. The method of claim 2, further comprising transmitting the at least one new IOV value in response to determining that an integrity protection algorithm to be used has changed.

4. The method of claim 1, wherein the new IOV is for use in ciphering communications between the network node and the mobile station.

5. The method of claim 4, further comprising transmitting the at least one new IOV value in response to determining that an encryption algorithm to be used has changed.

6. The method of claim 1, further comprising setting the counter value to a predetermined value when re-authenticating the mobile station.

7. The method of claim 1, further comprising generating the fresh counter value by incrementing a previous counter value when transmitting the at least one new IOV value to the mobile station without re-authenticating the mobile station.

8. The method of claim 1, further comprising performing the method in response to the mobile station to perform idle mode mobility towards the network node.

9. The method of claim 8, further comprising obtaining a counter value from a serving network node.

10. The method of claim 9, further comprising obtaining security related information from the serving network node.

11. The method of claim 1, wherein the at least one new IOV value, the fresh counter value associated with the or each new IOV value, and the calculated message authentication code are sent to the mobile station in a Logical Link Control Exchange Identification command message.

12. A computer program product comprising a non-transitory computer readable medium storing computer program instructions for configuring a network node to perform the method of claim 1.

13. A network node for use in a cellular communications network, the network node comprising:
a processor; and
a memory, the memory containing instructions executable by the processor, such that the network node is configured to:
generate at least one new input offset value (IOV) value for use in protecting communications between the network node and a mobile station;
associate a fresh counter value with the or each new IOV value;
calculate a message authentication code based on at least the at least one new IOV value, the fresh counter value associated with the or each new IOV value, and a constant indicating that the message authentication code is calculated to protect the new IOV value; and
transmit to the mobile station a message comprising a container that includes the at least one new IOV value, the fresh counter value associated with the or each new IOV value, and the calculated message authentication code.

14. The network node of claim 13, wherein the network node is an Enhanced Serving GPRS Support Node.

15. A method performed by a network node in a cellular communication network, the method comprising:
generating at least one new input offset value (IOV) value for use in protecting communications between the network node and a mobile station;
calculating a message authentication code based on at least the at least one new IOV value, an incremented IOV counter value, and a constant indicating that the message authentication code is calculated to protect the new IOV value; and transmitting a message comprising a container that includes the at least one new IOV value, the IOV counter value, and the calculated message authentication code to the mobile station.

16. A computer program product comprising a non-transitory computer readable medium storing computer program instructions for configuring a network node to perform the method of claim 15.

17. A network node for use in a cellular communications network, the network node comprising:
   a processor; and
   a memory, the memory containing instructions executable by the processor, such that the network node is configured to:
   generate at least one new input offset value (IOV) value for use in protecting communications between the network node and a mobile station;
   calculate a message authentication code based on at least the at least one new IOV value, an incremented IOV counter value, and a constant indicating that the message authentication code is calculated to protect the new IOV value; and
   transmit a message comprising a container that includes the at least one new IOV value, the IOV counter value, and the calculated message authentication code to the mobile station.

* * * * *